May 6, 1930.  R. L. MULLER  1,757,134
ACCOUNTING MACHINE
Filed July 23, 1928  4 Sheets-Sheet 1

INVENTOR
Robert L. Muller
BY
Rector, Hibben, Davis, & Macauley
ATTORNEYS

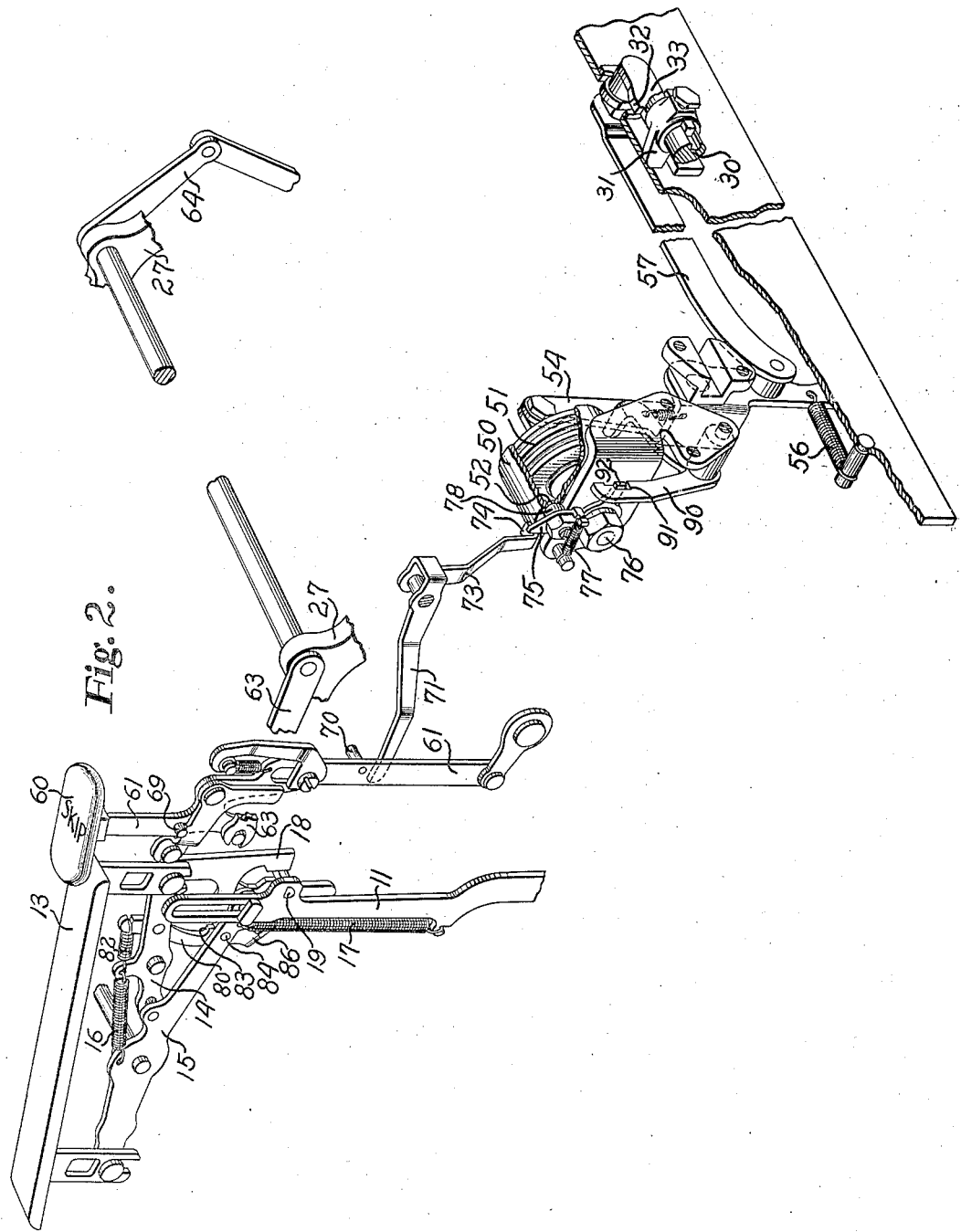

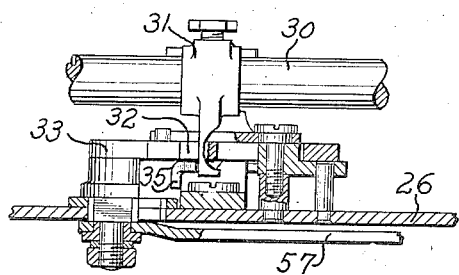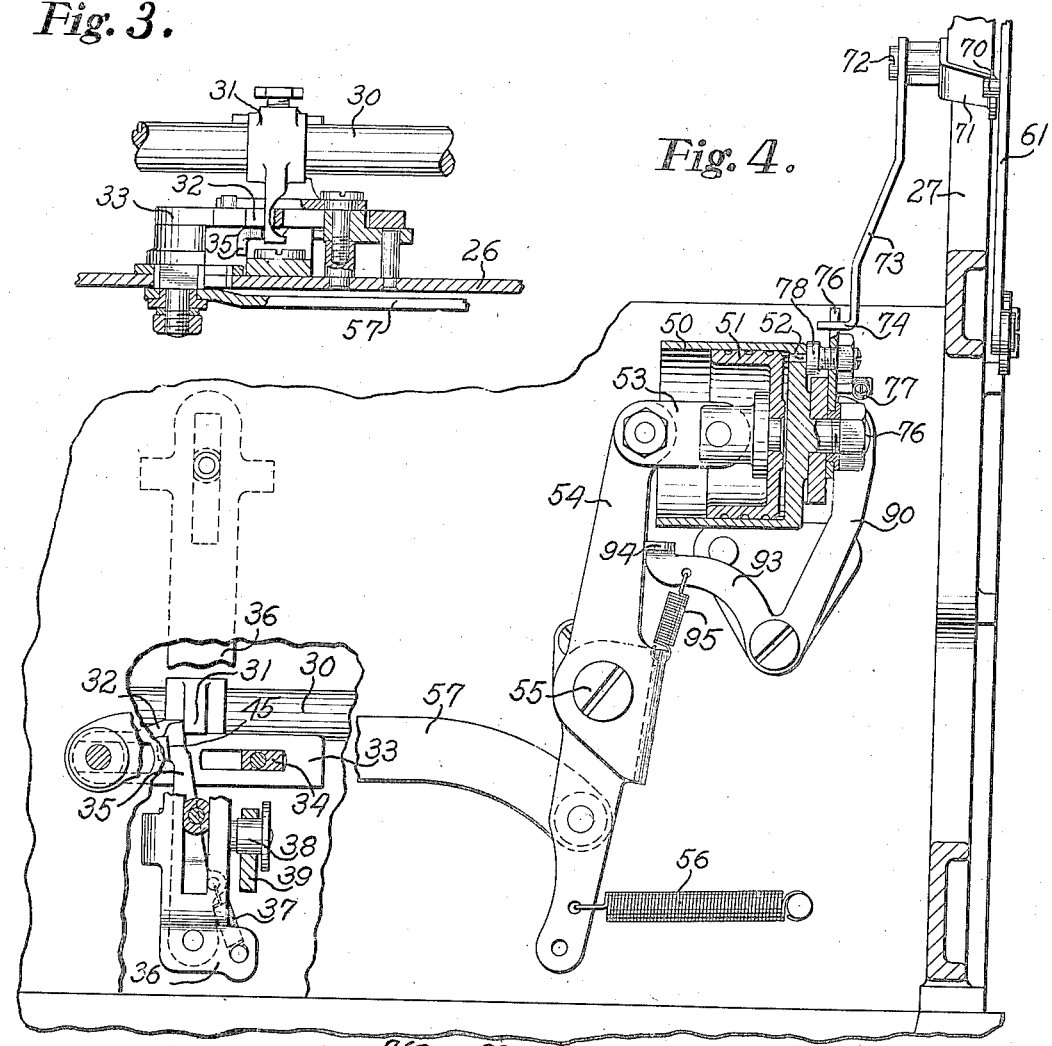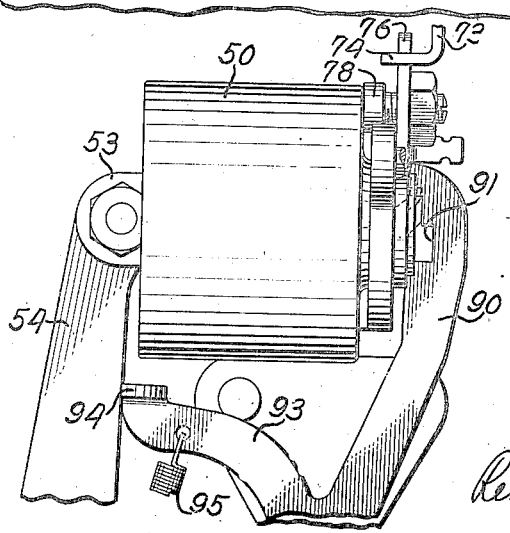

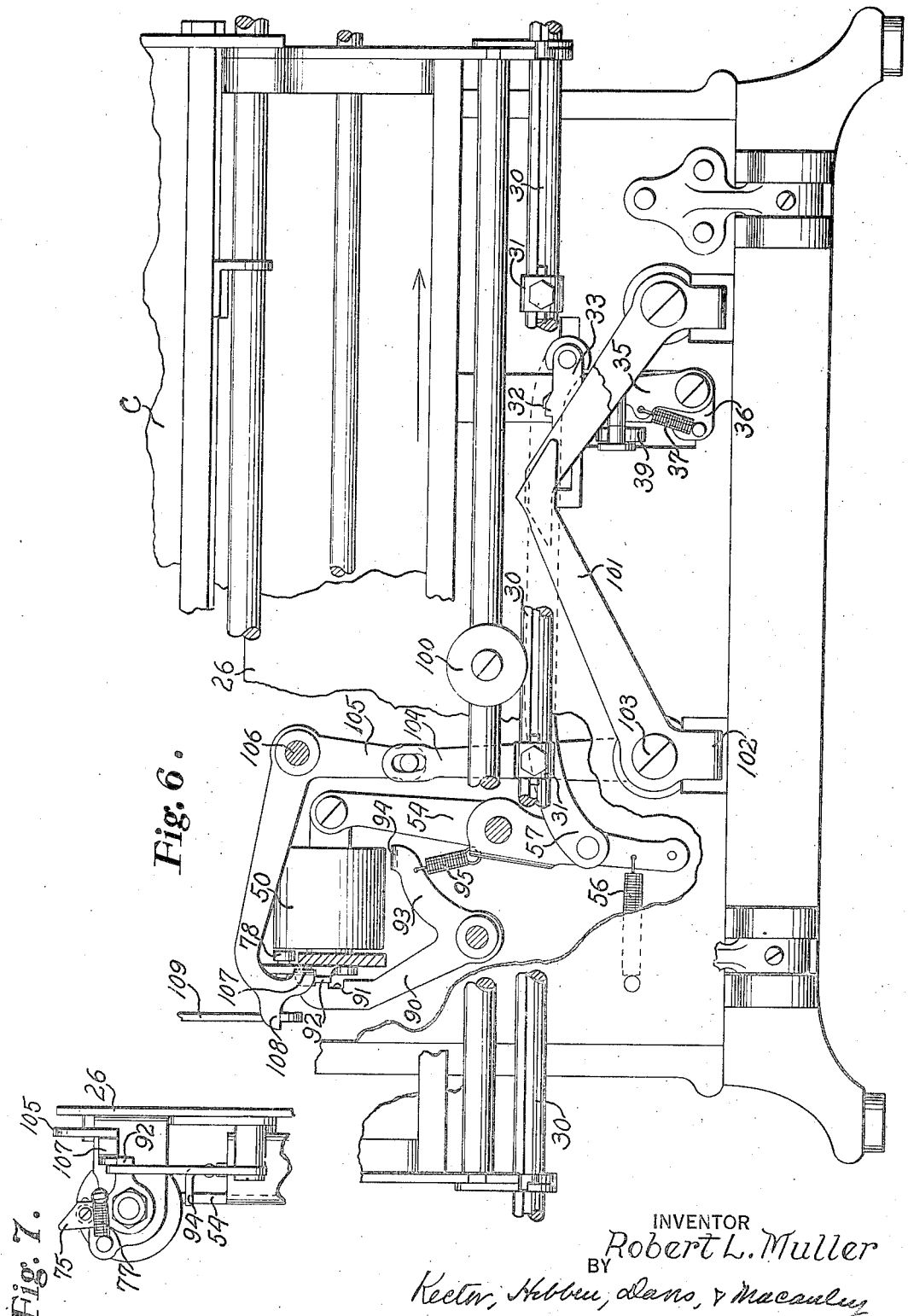

Patented May 6, 1930

1,757,134

UNITED STATES PATENT OFFICE

ROBERT L. MULLER, OF DETROIT, MICHIGAN, ASSIGNOR TO BURROUGHS ADDING MACHINE COMPANY, OF DETROIT, MICHIGAN, A CORPORATION OF MICHIGAN

ACCOUNTING MACHINE

Application filed July 23, 1928. Serial No. 294,637.

This invention relates to an accounting machine of the type having a traveling paper carriage that is tabulated from one columnar position to another, and the invention is directed particularly to an improved mechanism for automatically cushioning the shock of stopping the paper carriage in its various columnar positions.

The paper carriages of accounting machines are usually urged in one direction by a spring motor and released to move under the influence of this motor by a tabulating mechanism which is actuating during the later part of a stroke of operation of the machine. The carriage is thus released from one columnar position when the work in that column is finished and it moves to the next position where it is stopped in position for the next operation.

After the carriage has reached the limit of its travel in one direction, it is automatically returned in a Burroughs machine by a motor-driven mechanism disclosed in Rinsche Patent No. 1,580,534, April 13, 1926.

The carriages are relatively heavy and they gain considerable momentum in moving from one columnar position to another. If stopped suddenly, the shock is detrimental to the machine and it also causes an unpleasant noise. In order to avoid this, a cushioning mechanism has been provided such as shown in Rinsche Patent No. 1,516,685, November 25, 1924, which will absorb the shock of stopping the carriage when it is tabulated the distance of one column. However, the machine is often called upon to perform work that involves having the carriage skip several columns in being tabulated. When this occurs the carriage gains speed and momentum and the normal cushioning means will not properly absorb the shock of stopping it.

If the cushioning means is adjusted to absorb the shock properly when the carriage skips several columns, it is too strong when the carriage moves only from column to column. Heretofore, an extra governor has been employed for controlling the speed of the carriage when it skips several columns, but this governor increases the cost of the machine and complicates the equipment. Upon eliminating the governor, however, the carriage travels too fast and gains too much momentum to enable the cushioning means to properly control the impact of the blow. If the spring motor is weakened to cut down the speed of the carriage, a satisfactory operation can be obtained when the carriage is skipping one or more columns, but when the carriage is moving from column to column only and when the movement involves the operation by the carriage of the control levers at the rear, the spring motor does not have sufficient strength to overcome the load required to operate the control levers.

The present invention has been devised to overcome these difficulties and it accomplishes the result by automatically varying the cushioning effect of the cushioning means in accordance with the distance through which the carriage is moved.

The object of the invention is to provide an improved cushioning means for the carriages of accounting machines and the like.

A more particular object is to provide an improved cushioning means whose action will be automatically varied in accordance with the distance through which the carriage is tabulated.

Other objects and advantages of the invention will appear from the specification and drawings.

An embodiment of the invention is shown in the accompanying drawings in which,—

Fig. 2 is a perspective view of the cushioning mechanism and its controls, the parts being shown in the position they occupy when the carriage is moving while skipping one or more columns;

Fig. 3 is a partial plan view of the tabulating mechanism showing the carriage stops;

Fig. 4 is a partial elevation of the carriage tabulating mechanism and the cushioning means, the view being taken from the inside of the machine and showing one of the carriage stops contacting the stop plate which holds the carriage in its different columnar positions;

Fig. 5 is an enlarged side elevation of the dash pot associated with the cushioning means, some of the controls for the dash pot also being illustrated;

Fig. 6 is a rear elevation of the machine showing another form of controlling mechanism for the cushioning means, the back plate being cut away to illustrate the cushioning means, and the carriage being shown while moving during skipping one or more columns; and Fig. 7 is an end elevation of the cushioning means showing how it is controlled by the mechanism illustrated in Fig. 6.

Figure 1:
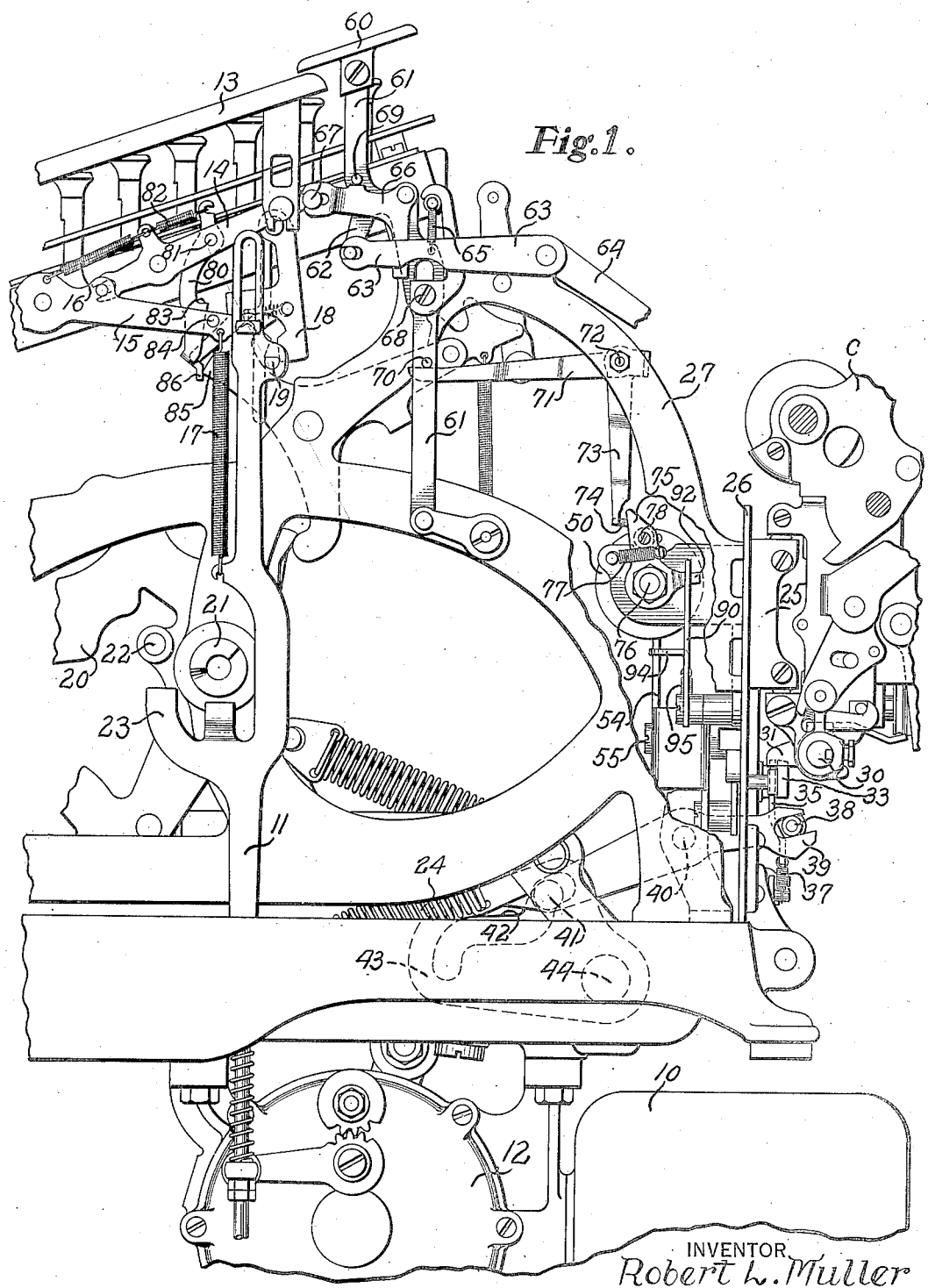
Figure 1 is a partial right side elevation of the rear portion of a Burroughs accounting machine showing the invention applied thereto, the parts being in normal position.

The invention is shown applied to a Burroughs accounting machine, the general features of which are well known in the art so that a description of them is unnecessary in the present application. It will be understood, of course, that the invention may also be used with accounting machines of other makes.

The machine is driven by an electric motor 10 that gives the machine a stroke of operation when a link 11 is raised, the link operating a clutch and starting switch enclosed in the housing 12. The link 11 is raised by depressing a starting bar 13 that is connected to two pivoted levers 14 and 15, which are also pivoted together, so that when the bar is depressed the lever 14 is rocked clockwise and the lever 15 counterclockwise. A spring 16 connected between the levers acts to urge them toward normal position and to restore the starting bar after it has been depressed. The lever 15 has a pin and slot connection with the end of link 11 and it is also connected to the link by a spring 17 so that, when the motor starting bar 13 is depressed, the link 11 is yieldingly raised to cause the motor to give the machine a stroke of operation. After the link is raised, it is releasably held in position by a scissors latch 18 engaging a stud 19 on the link. As the machine starts to operate, a well-known full stroke sector 20, pivoted at 21, is rocked counter-clockwise, whereupon a stud 22 on the sector engages a lateral projection 23 on the link 11 and moves the link downward to disconnect the motor and stop it at the end of the forward stroke of the machine, the machine then being returned to normal by springs 24. Depression of the starting bar thus normally causes the machine to be operated once, that is, to be given a forward and a return stroke of operation.

The traveling paper carriage, which will be designated generally as C, is mounted at the rear of the machine to move on a track 25 supported by a back panel 26 carried by the frame 27 of the machine. The carriage is normally urged to the left, as viewed from the front of the machine by a spring drum, not shown, but which is illustrated in numerous prior patents, for example, Rinsche No. 1,580,534.

The tabulating mechanism will be described only briefly as it is also well known, being shown, for example, in Rinsche No. 1,516,685. Moving laterally with the carriage is a rock shaft 30 carrying a series of adjustable carriage stops 31 adapted to engage a shoulder 32 on a sliding stop plate 33 mounted on the back panel 26 to have a limited sliding movement on the stud 34 illustrated in Fig. 4. When the carriage is in one of its columnar positions the stop 31 corresponding to that position contacts the shoulder 32 and the slide 33 occupies the Fig. 4 position, in which position the parts remain until the tabulating mechanism is manipulated to release the carriage. The carriage is released by rocking the shaft 30 so as to raise the stop 31 above the shoulder 32. The carriage then moves to the left as viewed in Fig. 4 under the influence of its spring until the next stop 31 contacts the shoulder 32 whereupon the carriage is arrested in its next columnar position.

The shaft 30 is rocked near the end of the return stroke of operation of the machine by a pawl 35 (Fig. 4), pivoted on a slide 36 and urged clockwise by a spring 37. The slide 36 carries a lateral stud 38 over which engages the bifurcated end of a lever 39 pivoted at 40 (Fig. 1), the other end of the lever having a stud 41 operating in a cam slot 42 in a plate 43 fixed to the shaft 44. As the motor gives the machine a stroke of operation, the shaft 44 is rocked clockwise and then returned counterclockwise. During the forward or clockwise stroke the lever 39 is rocked clockwise which pulls the slide 36 down, whereupon the spring 37 snaps the pawl 35 clockwise until a lateral lug 45 on the pawl engages the side edge of a slide on the back panel (not shown). This positions the end of the pawl under the stop 31. During the return or counter-clockwise movement of the shaft 44, the lever 39 is rocked counter-clockwise which raises the slide 36 whereupon the pawl 35 engages the stop 31 and rocks it upward until it is raised above the shoulder 32. This frees the carriage and, as soon as the carriage moves to the left, the stop 31 is free from the pawl 35 whereupon the rock shaft 30 moves back to normal and the next or succeeding stop 31 is positioned so that, as the carriage approaches its next columnar position, the stop engages the side edge of the pawl 35 and the shoulder 32 of the slide plate 33 and moves the parts to the Fig. 4 position where the carriage is arrested.

The cushioning means includes a dash pot having a cylinder 50 in which operates a piston 51, a vent 52 being provided in the bottom of the cylinder to permit air to slowly escape when the piston moves from left to right as viewed in Fig. 4. The piston is connected by a link 53 with one end of a lever 54 pivoted at 55 and urged counter-clockwise by a spring 56. The lower end of the lever 54 is connected by a link 57 to the sliding stop plate 33. When the tabulating mechanism is operated to release the stop 31 from the slide plate 33, the spring 56 rocks the lever 54 counter-clockwise which results in pulling the slide 33 to the right in Fig. 4 and in moving the piston 51 to the left or toward the outer end of the cylinder 50. Accordingly, when the next stop 31 strikes the shoulder 32 of the slide 33, the slide moves to the left and rocks the lever 54 clockwise against the tension of spring 56, thereby causing the piston 51 to move the right or toward the bottom of the dash pot cylinder 50. The restricted orifice through which the air must pass as the cylinder moves toward the bottom of the dash pot gives a cushioning action which, together with the tension of spring 56, serves to absorb the shock of stopping the carriage.

The tabulating mechanism is operated to cause the carriage to skip several columns by depressing a special bar 60 called the "skip tab bar". This bar overlies the starting bar 13 so that when the skip tab bar is depressed, the starting bar 13 is also depressed and the motor is caused to give the machine a stroke of operation. The bar 60 has a stem 61 slidably mounted on the frame of the machine, the stem being provided with a projection 62 carrying a stud that engages in the bifurcated end of a pivoted arm 63 having a rearward extension 64 that controls the tabulating mechanism to cause the carriage to skip one or more columns as described in Rinsche Patent No. 1,580,534. The bar 60 is normally urged toward its undepressed position by a spring 65 connected to the lever 63. The stem 61 is also connected to the motor controlling connections by a pawl 66 pivoted on the stem 61 and provided with a bifurcated end engaging over a stud 67 on the end of lever 14. The tail of this pawl can pass either above or down along one side of an abutment 68 and the stem 61 has a stud 69 for engaging the pawl. This provides an interlocking connection between the starting bar 13 and the "skip tab" bar 60 which prevents either bar being depressed when the other is depressed. It also prevents the starting bar 13 from being returned to normal unless the "skip tab" bar is also returned to normal. By means of the connections described, when the skip tab bar 60 is depressed, the machine is given a stroke of operation and the tabulating mechanism is conditioned so that the carriage skips a predetermined number of columns as it moves from right to left.

The cushioning means is automatically controlled as an incident to the movement of the carriage as it skips one or more columns.

The means for varying the action of the cushioning means may be conditioned either by the "skip tab" mechanism or by the carriage itself, both forms being illustrated. The connections controlled by the "skip tab" mechanism will be described first.

Referring to Fig. 1, it will be observed that the stem 61 of the "skip tab" bar 60 has a stud 70 positioned to engage the outer end of one arm 71 of a bell crank lever pivoted at 72. The other arm 73 of this lever has a lateral lug 74 engaging the end of an arm 75 pivoted at 76 and urged counter-clockwise, as viewed in Fig. 1, by a spring 77. The arm 75 carries a flat headed stud or valve 78 (Fig. 4) which moves over the bottom of the cylinder 50 and, when the arm 76 is properly positioned, this stud partially closes the opening 52 in the bottom of the cylinder so as to greatly retard the exit of air therethrough. It will be evident that, when the skip tab bar 60 is depressed, the arm 75 is moved clockwise from its Fig. 1 position to a position such that the valve 78 partially closes the opening 52 in the bottom of the cylinder 50.

If means were not provided to prevent it, the "skip tab" bar 60 would normally be released to return to its undepressed position along with the motor bar 13 near the end of the forward stroke of the machine. It will be understood that the carriage is not tabulated until the latter part of the return stroke of the machine. It will be clear that, if the "skip tab" bar should be released prior to the carriage tabulation, the arm 75 would move back to normal under the influence of its spring 77 and the cushioning means would be restored to its normal condition before it could act to cushion the extra movement of the carriage. In order to prevent this, means is provided for maintaining the cushioning means in the condition in which it is placed by depression of the "skip tab" bar.

When the "skip tab" bar 60 is depressed, the lever 15 is rocked counter-clockwise through the connections 66—67—14 which raises the link 11 to a position where it is held by the scissors latch 18. The initial holding of the cushioning mechanism in its set position is thus obtained by the action of the scissors latch which holds the "skip tab" bar depressed, said bar holding the cushioning mechanism through the connections 70—71—73—74.

As soon as the machine starts to operate another device comes into action to maintain the cushioning means in its set condition. This comprises a latch 80 (Fig. 1) pivoted at 81 and urged counter-clockwise by a spring 82. This latch has a shoulder 83 adapted to engage under a stud 84 on the lever 15. When the "skip tab" bar 60 is depressed the lever 15 is moved counter-clockwise far enough to position the stud 84 so that the latch 80 can move under it but the latch is temporarily detained by a rock arm 85 that engages a lug 86 on latch 80. As soon as the machine starts to operate the rock arm 85 moves away from lug 86 whereupon the spring 82 snaps the shoulder 83 of latch 80 under the stud 84 and the lever 15 is latched in position. The holding of the lever 15 in its moved position does not prevent the link 11 from being moved downward by the stud 22 on the full stroke sector 20 at the end of the forward stroke because of the pin and slot connection between the upper end of the link and the lever 15. When the link is moved down one of the arms of the scissors latch 18 moves above the stud 19 and prevents return of the link. The link can be released only by downward or clockwise movement of the lever 15 which causes stud 84 to engage a tail piece on the arm of the scissors latch and move said arm out of the path of stud 19. From the above it will be noted that as soon as the machine starts to operate the cushioning means is latched in its set condition by the latch 80 which holds the lever 15 in its moved position, said lever acting to latch the cushioning means through connections 14—67—66—61—70—71—73. This latch acts to hold the parts in position after the link 11 is moved downward from control by the scissors latch 18. Even though the action of latch 80 takes place through the lever 15 associated with the motor bar 13, the motor controlling connections operate in the normal manner to release the power drive at the end of the forward stroke so that the machine will be operated only once.

It is necessary, however, to eventually release the lever 15 and its associated parts so that they may be in condition for the next operation of the machine. This release is accomplished near the end of the return stroke of the machine by the rock arm 85 which strikes the lug 86 on latch 80 and moves the latch to release lever 15. The lever thereupon moves clockwise to its normal position under the influence of its spring 16. This releases both the motor bar 13 and the "skip tab" bar 60 for movement to normal.

It is not desirable, however, to release the arm 75 associated with the cushioning means at the same instant that the "skip tab" bar is released because the carriage moves during the latter part of the return stroke of the machine and it is desirable to have the cushioning means properly conditioned until the carriage has completely reached its new columnar position. An additional latching means is accordingly provided comprising a latch in the form of a bell crank lever illustrated in Figs. 4 and 5. One arm 90 of this latch has a notch 91 in it (Fig. 5) for engaging over a tail piece 92 on the arm 75. The other arm 93 of the latch has a lateral lug 94 positioned to be contacted by the lever 54. The latch is urged in a counterclockwise direction, as viewed in Fig. 4, by a spring 95. As long as the carriage remains in the columnar position it occupies at the start of the operation of the machine, that is, with the carriage stop 31 against the shoulder 32 on the slide plate 33, the latch is held disabled by the lever 54 which contacts the lug 94 on the arm 93 and holds the arm 90 out of the path of the tail 92 of the arm 75. However, when the slide 33 is freed of the stop 31 by the operation of the tabulating mechanism during the latter part of the return stroke of the machine, the lever 54 is moved counterclockwise by its spring 56 which frees the latch 90—93, whereupon the spring 95 snaps it counterclockwise and the notch 91 moves over the tail 92 to lock the arm 75 in position.

As the next carriage stop 31 strikes the shoulder 32 on the slide plate 33, the lever 54 is moved clockwise against the tension of spring 56 and the piston 51 is forced into the cylinder 50 but, on account of the fact that the valve 78 partially closes the vent 52, movement of the piston is retarded more than usual and the cushioning action of the cushioning means is greatly increased to absorb the greater impact caused by the carriage skipping one or more columns before coming to rest. As the carriage reaches its final position for the column to which it is being moved, the piston moves to the bottom of the cylinder, and the lever 54 contacts the lug 94 on the latch 90—93 and moves the latch clockwise to release the arm 75 which is thereupon moved back to normal position by its spring 77.

The various parts above described are timed to operate as follows: when the skip tab bar is depressed, the arm 75 is moved to position the valve 78 partially over the opening 52 and the starting bar 13 is depressed to cause the machine to be operated, the parts being held in moved position by the scissors latch 18. As the machine operates the latch 80 is released and it engages the stud 84 and holds the "skip tab" bar and its connections in depressed position so as to hold the arm 75 in active position. During the latter part of the return stroke of the machine the tabulating mechanism is operated and the lever 54 is freed to be moved counterclockwise by its spring 56. This frees the latch 90—93 which is thereupon moved by its spring 95 to hold the arm 75 against movement. Immediately thereafter the member 85 strikes the lip 86 of the latch 80 and moves it to a position to release the arm 15 so that the starting bar and the "skip tab" bar can move back to normal. After the carriage is stopped in its new columnar position, that is, when the piston reaches the bottom of the dash pot, the latch 90 is released and the arm 75 moves back to normal.

In this manner the cushioning action of the cushioning means is increased automatically when the carriage skips one or more columns in being tabulated, the means for increasing said cushioning action being controlled by the mechanism used for moving the carriage and by the movement of the carriage itself.

The conditioning of the cushioning means may be controlled in other similar ways, one of which is illustrated in Figs. 6 and 7. The means for varying the cushioning effect is conditioned in the form shown in Figs. 6 and 7 by movement of the carriage itself.

In this form, the carriage is provided with a roller 100 adapted to engage an arm 101 of a yoke pivoted at 103 and provided with another arm 104 having a pin and slot connection with a bell crank lever 105 pivoted at 106 and provided with a lateral lug 107, illustrated most clearly in Fig. 7, which engages the tail 92 of the arm 75. The roller 100 is positioned so that, after the carriage is released and as it moves during its tabulation while skipping one or more columns, and prior to the time it reaches its final position in the column that it is to occupy, the roller 100 engages the arm 101 and rocks the yoke 102 clockwise which, in turn, rocks the bell crank lever 105 counterclockwise and moves the arm 75 to cause the valve 78 to partially close the vent 52 in the cylinder 50. It will be recalled that, when the carriage is released, the lever 54 is moved by its spring 56 the movement being clockwise as viewed in Fig. 6. This releases the latch 90—93 which is then urged toward latching position by its spring 95 and, as soon as the bell crank lever 104 moves the arm 75 clockwise, the latch snaps into position to hold the arm 75 in the position to which it has been moved. The latch is released in the same manner as previously described. The cushioning means is thus automatically conditioned by the carriage itself just prior to the time the carriage reaches the place where the increased cushioning effect is necessary. One or more rollers 100 may be employed depending upon how many times the carriage is tabulated past one or more columnar positions during its movement from one limit to the other.

The bell crank lever 105 also has a projection 108 engaging a lever 109 operating an automatic repeat print mechanism described in Muller Patent No. 1,397,774. The one series of controls may thus be used to operate two mechanisms.

It is to be understood that the structure shown is for purposes of illustration only and that variations may be made in it without departing from the spirit and scope of the invention as defined by the claims.

I claim:

1. The combination in a machine of the class described, of a traveling paper carriage, mechanism for tabulating said carriage from one columnar position to another, cushioning means for cushioning the shock of stopping the carriage in the columnar positions to which it is moved, means operated automatically as an incident in the movement of the carriage to predetermined columnar positions for increasing the cushioning effect of the cushioning means, a latch for holding said automatic increasing means in the position to which it is moved, and connections operated by the carriage as it reaches its final position in the column to which it is being moved for releasing the latch.

2. The combination in a machine of the class described, of a traveling paper carriage, mechanism for tabulating the carriage from one columnar position to another, cushioning means for cushioning the shock of stopping the carriage in the columnar positions to which it is moved, said cushioning means including a dash pot having a vent, and means set automatically by the carriage as it moves to certain columnar positions for partially closing said vent.

3. The combination in a machine of the class described, of a traveling paper carriage, mechanism for tabulating the carriage from one columnar position to another, cushioning means for cushioning the shock of stopping the carriage in the columnar positions to which it is moved, said cushioning means including a dash pot having a vent, means operated automatically by the carriage as it moves toward certain columnar positions for partially closing the vent, a latch for holding said vent closing means in the position to which it is moved, and connections operated by the carriage as it moves to its final position in the column to which it is being moved for releasing the latch.

4. The combination in a machine of the class described, of a traveling paper carriage, mechanism for tabulating the carriage from one columnar position to another, cushioning means for cushioning the shock of stopping the carriage in the columnar positions to which it is moved, said cushioning means including a dash pot having a vent, and means conditioned automatically as an incident to the movement of the carriage to predetermined columnar positions for partially closing said vent.

5. The combination in a machine of the class described, of a traveling paper carriage, mechanism for tabulating the carriage from one columnar position to another, cushioning means for cushioning the shock of stopping the carriage in the columnar positions to which it is moved, said cushioning means including a dash pot having a vent, means conditioned automatically as an incident to the movement of the carriage to predetermined columnar positions for partially closing said vent, and connections operated by the carriage as it moves to its final position in said predetermined columnar position for causing said vent closing means to be returned to normal.

In testimony whereof, I have subscribed my name.

ROBERT L. MULLER.